Figure 1:
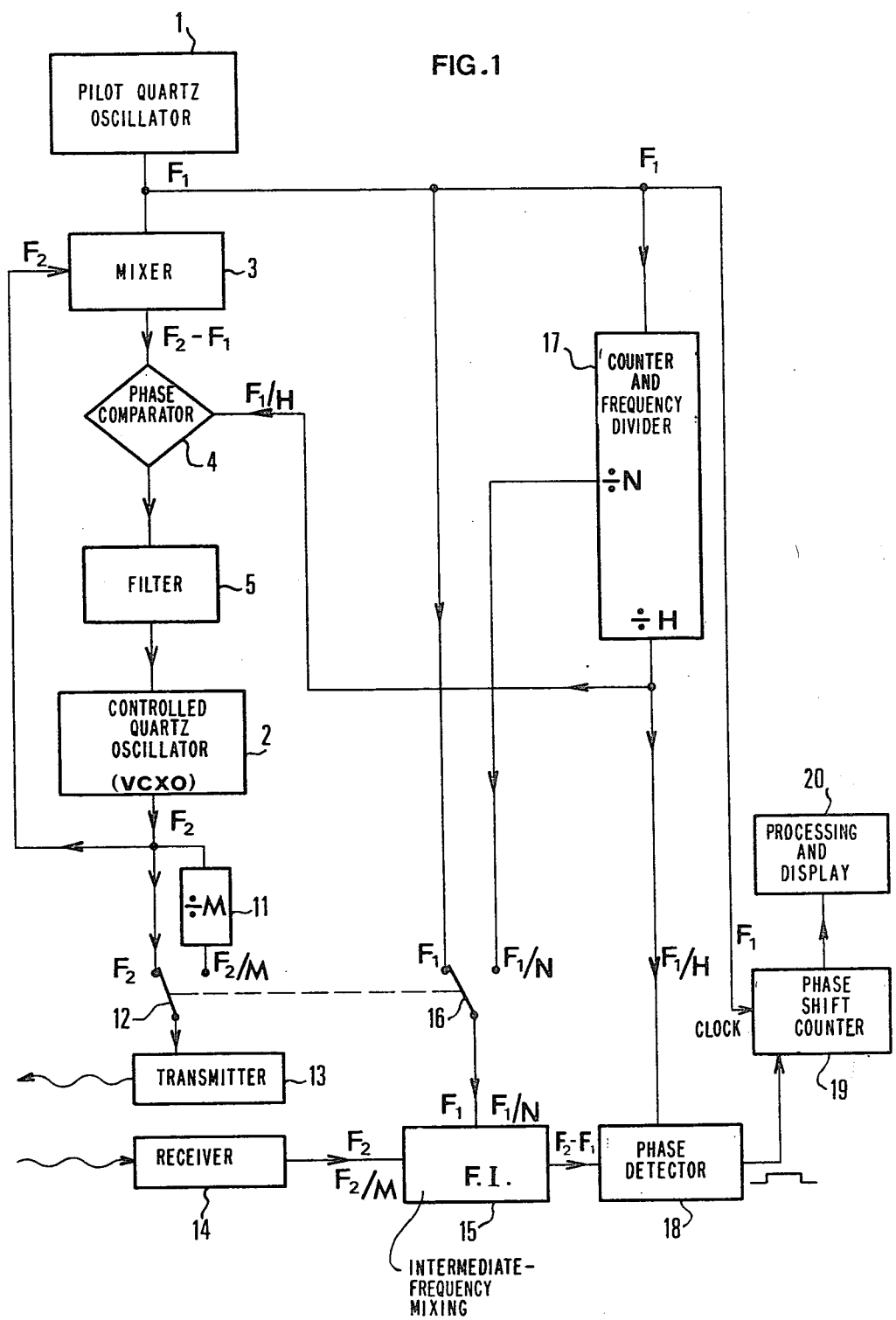

United States Patent [19]
Hullein et al.

[11] 4,146,328
[45] Mar. 27, 1979

[54] TELEMETER COMPRISING A PILOT OSCILLATOR AND AN OSCILLATOR KEPT IN PHASE WITH THE PILOT OSCILLATOR

[75] Inventors: François M. L. Hullein, Nantes; Guy Normand, Nord S. Erdre, both of France

[73] Assignee: Societe d'Etudes Recherches et Constructions Electroniques, Parquefou, France

[21] Appl. No.: 839,691

[22] Filed: Oct. 5, 1977

[30] Foreign Application Priority Data

Oct. 8, 1976 [FR] France .................. 76 30263

[51] Int. Cl.² ............................................. G01C 3/08
[52] U.S. Cl. ...................................... 356/5; 340/1 R; 343/12 R
[58] Field of Search .................. 343/7.7, 12 R; 356/5; 340/1, 3 R

[56] References Cited
U.S. PATENT DOCUMENTS

| | | | |
|---|---|---|---|
| 3,728,025 | 4/1973 | Madigan et al. | 356/5 |
| 3,778,159 | 12/1973 | Hines et al. | 343/12 R |
| 4,011,561 | 3/1977 | Dounce | 343/7.7 |

FOREIGN PATENT DOCUMENTS 1363119  5/1964  France .................. 343/12 R

Primary Examiner—S. C. Buczinski
Attorney, Agent, or Firm—Cullen, Sloman, Cantor, Grauer, Scott, & Rutherford

[57] ABSTRACT

An infra-red telemeter comprises a pilot oscillator 1 and a controlled oscillator 2 kept in phase with the pilot oscillator 1. The controlled oscillator 2 provides the modulation frequency for transmission, either directly for fine measurement or via a counter 11 which divides by M. for coarse measurement, while the pilot oscillator 1 provides a heterodyne frequency, either directly or after division by N in a counter 17, respectively. After the received modulation signal has been mixed with the heterodyne frequency, a phase detector 18 compares the phase of the mixed signal with the phase of a reference low frequency obtained by the frequency of oscillator 1 being divided by H in counter 17. The phase servo loop operates continuously, in the case of both fine and coarse measurement.

12 Claims, 2 Drawing Figures

TELEMETER COMPRISING A PILOT OSCILLATOR AND AN OSCILLATOR KEPT IN PHASE WITH THE PILOT OSCILLATOR

The invention relates to telemeters, i.e. devices for measuring a distance through the propagation time of a signal travelling to and fro between two points.

Conventional optical telemeters mainly use an infra-red signal which is modulated in amplitude. The infra-red signal is a thin beam and can thus be propagated a fair distance. The modulation in amplitude is periodic, and is used to determine the propagation time of the infra-red signal. This is done by determining the phase shift between the modulation of the signal when transmitted and its modulation on reception after the to and fro travel. Though the modulation is at high frequency, it has become conventional to measure the phase shift between two low-frequency signals. Firstly, by an heterodyning operation, the received modulation signal is mixed with the signal from a local oscillator to obtain a low frequency, which is hereinafter called the "perceptible frequency" since it bears the same phase information as the modulation signal received at high frequency. Secondly, a reference low frequency having the same value as the perceptible low frequency is produced by means of local oscillators. Next, the phase shift is measured between the reference low frequency and the perceptible low frequency coming from the received signal.

As is known, phase measurement of this kind is subject to ambiguity with respect to the propagation time. In order to resolve this ambiguity, it is known to use a second modulation signal having a lower frequency than the first. The term "fine measurement" will be used for measurement at the higher modulation frequency, and the term "coarse measurement" will be used for measurement at the lower or ambiguity resolution frequency.

In optical telemeters, the devices for producing and receiving the infra-red signal — an essential factor in distance measurement — subject it to phase shifts which are difficult to determine. In order to compensate for these interfering phase shifts, it is conventional to construct an internal optical path termed "calibration" path in the telemetry apparatus. At each modulation frequency, a measurement is made of (a) the phase shift undergone by the signal received after the actual to and fro travel and (b) the phase shift of the signal received after travelling along the calibration optical path. By making the difference between both phase shifts, one obtains a phase measurement free from interfering phase shifts.

Finally, a conventional optical telemeter comprises at least four different operations — i.e., fine measurement of the phase shift between the reference low frequency and the perceptible low frequency relative to the optical path to be determined; fine measurement of the phase shift between the reference low frequency and the perceptible low frequency relative to the calibration optical path; and two coarse measurements made in the same manner, but using the ambiguity resolution frequency as the modulation frequency.

In the case of fine measurement and ambiguity resolution measurement, there is no essential difference between the acquisition of phase information relating to the paths to be determined and the same operation performed on the calibration path. It is likewise irrelevant here that a large number of operations is made on each occasion and the mean value is obtained.

The present description, therefore, will deal with a measurement of phase-shift made on a certain optical path, without repeating each time that the process may comprise a large number of measurements of phase shift on the real path, the mean value being obtained, plus a large number of measurements of phase shift on the calibration path, the mean value being obtained, and the determination of the difference between the two mean values; the whole sequence of measurements being further repeated for each modulation frequency for purpose of ambiguity resolution.

Clearly, in order to resolve ambiguity in a convenient manner, it is very desirable that the perceptible low frequency should have the same value for fine measurement and coarse measurement.

In French Patent Application No. 72 42 852 (publication No. 2 209 111) there is proposed optical telemeter satisfying this condition. The last-mentioned telemeter comprises three oscillators. An independent oscillator is used to produce the modulation frequency. A second independent oscillator is used to produce the clock frequency, used mainly for counting to measure the phase shifts. A third oscillator, which is kept in phase with the second, defines the heterodyne frequency. Switchable dividing counters are used for selection among the modulation frequencies and heterodyne frequencies associated with (a) fine measurement and (b) coarse measurement.

In the prior patent application, the servo means connecting the clock-frequency oscillator to the heterodyne frequency oscillator is a frequency servo loop. The operation of the loop is interrupted at each change in the type of measurement, e.g. each change from calibration measurement to measurement of the real path, or from fine measurement to ambiguity resolution.

The invention, therefore, relates to an optical telemeter comprising only two oscillators. One object of the invention is to connect one of the oscillators to the other via a phase-locking servo loop, which operates in the same manner for fine measurement and for ambiguity resolution.

Another object of the invention is to provide a telemeter having two oscillators and a phase-locking loop, which can be used for a number of ambiguity resolution frequencies without additional oscillators.

Accordingly, the invention relates to a device for determining distances, comprising a first oscillator at frequency $F_1$ and a second oscillator at frequency $F_2$, means for transmitting electromagnetic radiation modulated by the frequency $F_2$ of the second oscillator for travel on a path to be measured, means adapted to receive and demodulate the radiation after its travel to give a received signal having the modulation frequency $F_2$ and a phase related to the length of the travel or path, an heterodyne circuit for mixing the received signal with the frequency $F_1$ of the first oscillator, thus obtaining a perceptible low frequency $F \times F_1 - F_2$, having a phase likewise related to the length of the path, and means for determining the distance from the perceptible low-frequency phase.

According to one feature of the invention, one of the two oscillators is of a frequency-controllable one and a phase-locking loop keeps it in phase with the other oscillator. The phase-locking loop may comprises another heterodyning circuit which mixes the frequencies of the two oscillators, a phase comparator for comparing the mixture output phase with a reference phase, and means comprising a filter and being responsive to the phase comparator output for controlling the frequency-controllable oscillator. The reference phase is obtained by phase division, from the output of that one of the two oscillators which is not frequency-controllable.

According to a very preferred feature, the second oscillator, which provides the modulation frequency, is kept in phase with the first oscillator, which provides the heterodyne frequency. The reference low frequency is obtained by dividing the frequency of the first oscillator by an integer H. The same reference low frequency can be used as a phase reference for the phase comparator forming part of the servo loop.

Advantageously, the first oscillator also provides the clock frequency for counting pulses to measure the phase shift between the perceptible low frequency and the reference low frequency.

Figure 2:
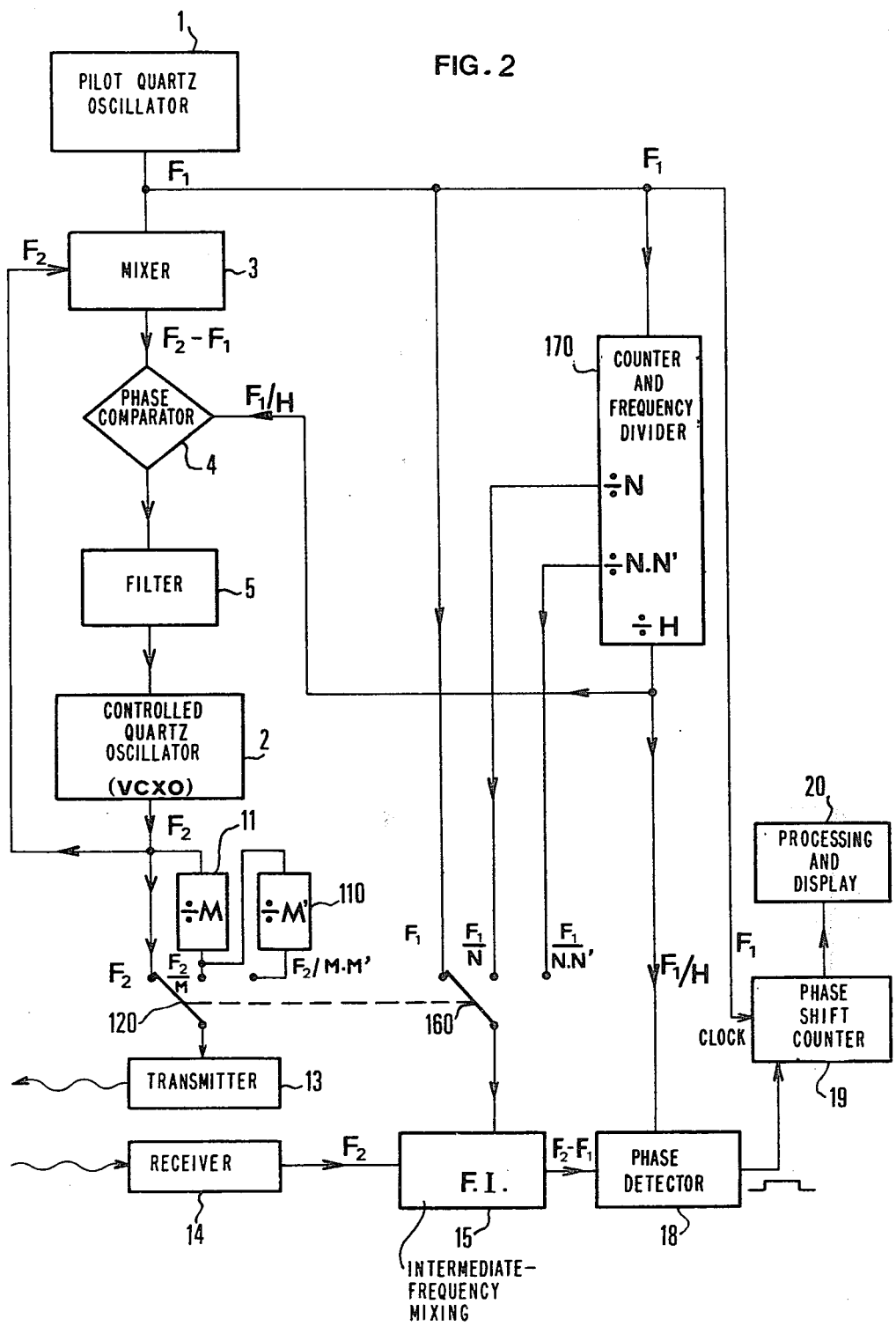

Other features and advantages of the invention will be clear from the following detailed description, with reference to the accompanying drawings, which are given by way of non-limitative example only and in which:

FIG. 1 is a block diagram of an optical telemeter according to the invention, comprising a fine measurement frequency and an aibiguity resolution frequency, and FIG. 2 is a a block diagram of a variant embodiment of the telemeter according to the invention, comprising two ambiguity resolution frequencies.

In FIG. 1, reference 1 denotes a pilot quartz oscillator delivering a frequency $F_1$. Oscillator 1 e.g. has a relative stability of $\pm 5.10^{-6}$, corresponding to an accepted error of $\pm 5$ mm per kilometer. Reference 2 denotes a voltage-controlled quartz oscillator (VCXO) delivering a frequency $F_2$. Oscillator 2 is controlled from oscillator 1 via a phase-locking loop which will now be described. A mixer 3 produces a signal whose frequency is the difference $F_2 - F_1$, and the signal is applied to one of the two inputs of a phase comparator 4. The other input of comparator 4 receives a frequency having a value $F_1/H$, obtained by division from frequency $F_1$, by means described hereinafter. For reasons likewise described hereinafter, the frequency $F_2 - F_1$ is equal to the frequency $F_1/H$. Consequently, the phase comparator outputs a slowly varying analog signal which travels through a loop filter 5 before being applied to the voltage control input of oscillator 2. This completes the locking loop connecting oscillator 2 to oscillator 1. The loop ensures that oscillator 2 is permanently kept in frequency and phase with oscillator 1.

The output of oscillator 2 is applied to a counter 11 dividing by M. A switch 12 is used for supplying transmission circuits 13 with either the frequency $F_2$ directly of the frequency $F_2/M$ output by the counter and divider 11. Thus, circuit 13 produces an infra-red signal which is modulated either by the frequency $F_2$ for fine measurement or by the frequency $F_2/M$ for ambiguity resolution.

Consequently, the receiving circuit 14 receives and demodulates the infra-red signal. After demodulation, the frequency $F_2$ is obtained in the case of fine measurement, or frequency $F_2/M$ in the case of ambiguity resolution. In both cases, the output signal of circuit 14 is applied to an intermediate-frequency mixing circuit 15. Circuit 15 mixes the received signal with a local signal selected by a switch 16. Switch 16 is mechanically coupled to switch 12. Consequently, when the received signal is $F_2$, the frequency applied by switch 16 to the mixing circuit 15 is $F_1$. On the other hand, when the received frequency is $F_2/M$, the frequency applied by switch 16 to mixer 15 is $F_1/N$. To this end, the frequency $F_1/N$ is produced by an intermediate output of a counter and frequency divider 17 whose input receives the frequency $F_1$. The final output of counter 17 provides a frequency $F_1/H$ used for another purpose.

As we shall see hereinafter, both at the fine-measurement frequency and at the aibiguity resolution frequency, the output of mixer 15 is always at a frequency of $F_2 - F_1 = F_1/H$. The output of mixer 3 constitutes the aforementioned perceptible low-frequency signal, which is applied to a phase detector 18. The phase reference signal received by the phase detector is the signal at the aforementioned frequency $F_1/H$. The output of phase detector 18 is a rectangular signal, the duration of which is related to the phase shift between the perceptible signal and the phase reference. The rectangular signal is applied to a phase shift measuring counter 19, which is supplied with the clock frequency, i.e. the frequency $F_1$ of oscillator 1.

The output of counter 19 is connected to a processing and display circuit 20. It is only at this circuit that it makes any difference whether the fine-measuring frequency or the ambiguity resolution frequency is used as modulation, or whether the infra-red signal propagates along the optical calibration path or along the real optical path corresponding to the distance to be measured.

In known manner, the processing and display circuit 20 is informed by the state of the coupled switches 12 and 16 whether the measurement in progress is a fine measurement or a coarse or ambiguity resolution measurement. Similarly, circuit 20 is informed whether the measurement relates to the real path or the calibration path, by means (not shown) relating to e.g. the position of the optical parallel circuit which causes the calibration path to act on the receiving circuit 14. On the basis of this information and the successive measurements received from counter 19, circuit 20 can calculate the desired distance in known manner.

The main novelty of the telemeter according to the invention is the aforementioned structure.

But, in addition, the Applicants have found that the telemeter structure can operate satisfactorily irrespective of the frequencies $F_1$ and $F_2$, provided that the relation between the divisor integers M, N and H is governed by certain conditions.

The research by the Applicants has shown that the difference $F_1 - F_2$ must then be equal in absolute value to the difference $F_2/M - F_1/N$ and the reference low frequency $F_1/H$.

Thus, the factors M, N and H must be related as follows:

$$M = N \frac{H \pm 1}{H \pm N} \qquad (1)$$

In this relation, the $\pm$ sign in the numerator is independent of the $\pm$ sign in the denominator.

Relation (1) is the second essential feature of the invention — i.e. the frequencies $F_1$ and $F_2$ can have any value in a telemeter constructed in the previously-described manner, in which the values of the divisors M, N and H are related in the aforementioned manner.

The relation expresses M as a function of N and H. Of course, it can be written differently, e.g. by expressing H as a function M and N:

$$H = N \cdot \frac{\pm M \pm 1}{M - N} \quad (2)$$

The applicants have noted that, since H is always positive, the same relation can be written:

$$H = \frac{N(M \pm 1)}{|M - N|} \quad (3)$$

where the symbol $|M - N|$ denotes the absolute value of $M - N$.

Finally, relation (1) can also be transformed by expressing N as a function of M and H:

$$N = \frac{HM}{H \pm M \pm 1} \quad (4)$$

During their research, the Applicants have also allowed for experimental considerations. It has been found desirable that the integers M and N should be approximately equal but should not be too large, to avoid excessive values of the modulation frequencies $F_1$ and $F_2$.

These considerations were applied to equation (3) hereinbefore, showing that the absolute value $|M - N|$ should be equal to unity, i.e. $M = N \pm 1$.

The following four applications, based on $M = N \pm 1$ were found to be preferable:

| | |
|---|---|
| a) $H = N^2$ | with $M = N + 1$ |
| b) $H = N^2$ | with $M = N - 1$ |
| c) $H = N(N + 2)$ | with $M = N + 1$ |
| d) $H = N(N - 2)$ | with $M = N - 1$ |

The cases $H = N^2$ are more advantageous, since a single counter can then give H and N without additional wiring.

The cases $M = N + 1$ are also more advantageous, since they are simpler to wire than the cases $M = N - 1$, in a counter dividing by N.

Consequently, the most advantageous application corresponds to case (a), and will be considered hereinafter. However, one or more of the other cases may be more advantageous under different circumstances, when it may be preferred to make $|M - N|$ equal to an integer slightly greater than 1.

Accordingly, the present preferred embodiment of the telemeter according to the invention corresponds to case (a).

Hitherto, we have considered only the relations to be satisfied between the frequencies obtained after mixing, i.e. the reference low frequency $F_1/H$ and $F_1 - F_2$ in fine measurement and $F_1/N - F_2/M$ in coarse measurement. However, the phase relations must also be considered.

In FIG. 1, the difference between the instantaneous phases of the input signals of the phase comparator 4 is a constant $\Phi_0$ peculiar to the phase loop; the phase of $F_1 - F_2$ is written $\phi_1 - \phi_2$ and the phase of $F_1/H$ is written $\phi_1/H$. We therefore have:

$$\phi_1 - \phi_2 - \Phi_0 = \phi_1/H \quad (5)$$

In fine measurement, a signal at the frequency $F_1 - F_2$ is obtained at the output of mixer 15. It bears the phase shift undergone by the infra-red signal $\Phi_{fu}$ along the real path or $\Phi_{fc}$ along the calibration path, plus the phase shift introduced in the transmission and receiving tracks $\Phi_{fi}$.

We thus have:

$$\phi_1 - \phi_2 - \Phi_0 - \Phi_{fu} - \Phi_{fi}$$

for the real path, and $$\phi_1 - \phi_2 - \Phi_0 - \Phi_{fc} - \Phi_{fi}$$

for the calibration path.

Since the difference between these two measurements is taken, we finally obtain:

$$\Phi_{fu} - \Phi_{fc}$$

from which it is easy to deduce $\Phi_{fu}$, since the length of the calibration path and consequently the value of $\Phi_{fc}$ are known.

In coarse measurement, a signal having the frequency $F_1/N - F_2/M$ and the phase $\phi_1/N - \phi_2/M - \Phi_1$ occurs at the output of mixer 15. The constant $\Phi_1$ depends on the constant $\Phi_0$ and on the initial state of counters 11 and 17. As before, the constant disappears when the difference is obtained between the coarse measurement made along the real path and along the calibration path.

Alternatively, the constants $\Phi_0$ and $\Phi_1$ can be eliminated without reference to the calibration paths, if counters 11 and 17 are suitably reset to zero.

We shall now, with reference to FIG. 2 describe another embodiment of the telemeter according to the invention, having two ambiguity-removing frequencies. Elements common to FIGS. 1 and 2 bear the same references and will not be described again.

In the second embodiment, the counter 11, which supplies the frequency $F_2/M$ from $F_2$, is now in series with a counter and divider 110 which supplies a frequency $F_2/M.M'$. Switch 120 can select one of the three frequencies $F_2$, $F_2/M$ and $F_2/M.M'$.

The counter and divider 17 in FIG. 1 is replaced by a counter and divider 170 having two intermediate outputs providing divisors N and N.N' and a final output for divisor H. Switch 160, in synchronism with switch 120 can select one of the frequencies $F_1$, $F_1/N$ and $F_1/N.N'$ in order.

The frequency $F_2/M.M'$ is used as modulation for the second resolution of ambiguity. $F_1/N.N'$ is the corresponding heterodyne frequency.

In FIG. 1, we saw that $F_1/H$ must be equal to the absolute value of $F_1 - F_2$ and the absolute value of $F_2/M - F_1/N$. In FIG. 2, $F_1/H$ must also be equal to the absolute value of $F_2/M.M' - F_1/N.N'$.

The Applicants have thus found an additional relation:

$$M' = N' \frac{H \pm N}{H \pm N \cdot N'} \quad (6)$$

For the same reasons as before, it has appeared very preferable to use the following solutions:

$$H = N^2, N = N'^2, M = N + 1 \text{ and } M' = N' + 1.$$

As before, the phase relations are based on the phase servo loop, and the phase constants are eliminated either by using the calibration path or by suitably resetting counters 11, 110 and 170 to zero.

The following are two sample applications:

| EXAMPLE 1 | (FIG. 1) |
|---|---|
| $F_1 = 4\ 871\ 444$ Hz | $F_2 = 4\ 870\ 255$ |
| $N = 64$ | $M = 65$  $H = 4096$ |

In this example, the ambiguity resolution is complete up to 2 Km.

| EXAMPLE 2 | (FIG. 2) |
|---|---|
| $F_1 = 8\ 768,599,75$ | $F_2 = 8\ 766\ 459$ |
| $N = 64$ | $M = 65$  $H = 4096$ |
| $N' = 8$ | $M' = 9$ |

In this example, the ambiguity resolution is complete up to 10 Km, with intermediate resolution over 1 111.11 m.

In the case of the above values, the integers M and M' define the ratios between the wavelengths used for coarse measurement and fine measurement. Since in the present case the integers are not multiples of 10, the processing and display means 20 advantageously comprises an efficient calculator, provided with a microprocessor.

On the other hand, counters 17 and 170 giving H, N and N' may advantageously in some cases be binary or decimal coded binary.

What is claimed is:

1. A distance determining device, comprising:
   a first oscillator at frequency $F_1$;
   a second oscillator at frequency $F_2$;
   one of said first and second oscillators being controllable in frequency;
   means for transmitting electromagnetic radiation modulated by the frequency $F_2$ of said second oscillator, for to and fro travel on a distance to be measured;
   means adapted to receive and demodulate the radiation, after its travel, into a received signal having the frequency $F_2$ and a phase related to said distance to be measured;
   a first heterodyning circuit for mixing said received signal with the frequency $F_1$ of said first oscillator, thus obtaining a perceptible low-frequency signal having a frequency $F_1 - F_2$ and a phase likewise related to said distance to be measured;
   a second heterodyning circuit for mixing the output frequencies of the two oscillators;
   a phase comparator for comparing the phase of the output signal from said second heterodyning circuit with that of a phase reference signal;
   means comprising a filter responsive to said phase comparator output for controlling said one of said first and said second oscillators being controllable in frequency; and
   means for obtaining distance information from the phase of said perceptible low-frequency signal.

2. A distance determining device according to claim 1, wherein said phase reference signal is obtained by phase division from the output of the one of the two oscillators which is not frequency controllable.

3. A distance determining device according to claim 1, wherein the oscillator being frequency controllable is the second one at frequency $F_2$.

4. A distance determining device according to claim 2, wherein means for obtaining information on the distance measures the phase-shift between said perceptible low-frequency signal and a reference low-frequency signal by counting clock pulses, with the frequency of the clock pulses being the frequency $F_1$ of the first oscillator.

5. A distance determining device according to claim 1, wherein the means for obtaining information on the distance senses the phase shift between said perceptible low frequency signal and a reference low frequency signal, with the reference low frequency signal being obtained by dividing the frequency $F_1$ of the first oscillator by an integer H.

6. A distance determining device according to claim 5, wherein the phase reference signal is derived from said reference low frequency signal.

7. A distance determining device according to claim 5, having a fine measurement mode in which the modulation frequency is $F_2$ and the heterodyne frequency is $F_1$ and at least a first coarse measurement mode in which the modulation frequency is switched to a lower value $F_2/M$ and the heterodyne frequency is switched to a lower value $F_1/N$, M and N being integers and the lower frequency values being obtained by division from the frequencies of the second and first oscillators, respectively, wherein integers M, N and H satisfy the following relation:

$$M = N \frac{H \pm 1}{H \pm N}$$

8. A distance determining device according to claim 7, wherein integer H is a multiple of integer N, whereby a single counter can provide the frequencies $F_1/N$ and $F_1/H$.

9. A distance determining device according to claim 8, wherein $H = N^2$ and $M = N + 1$.

10. A distance determining device according to claim 7, further having a second coarse measurement mode, in which the modulation frequency is switched to a still lower value $F_2/M \times M'$ and the heterodyne frequency is switched to a still lower value $F_1/N \times N'$, M' and N' being integers and the still lower frequency values being obtained by division from the frequencies of the second and first oscillators, respectively, wherein integers M', N', N and H satisfy the following relation:

$$M' = N' \frac{H \pm N}{N \pm N \times N'}$$

11. A distance determining device according to claim 10, wherein $N = N'^2$ and $M' = N' + 1$.

12. A distance determining device according to claim 1, wherein the electromagnetic radiation is an infra-red radiation, the transmitting means and the receiving and demodulating means are adapted for sequential cooperation to have the infra-red radiation to travel on an actual path to be measured and on a calibration path, successively, and the received signal and perceptible low frequency signal are sequentially related to the actual path and to the calibration path.

* * * * *